United States Patent [19]
DeBauche

[11] Patent Number: 5,793,187
[45] Date of Patent: Aug. 11, 1998

[54] SYSTEM AND METHOD FOR INCREASING THE AVAILABLE ENERGY IN NON-RECHARGEABLE BATTERIES

[75] Inventor: Bradley J. DeBauche, Delray Beach, Fla.

[73] Assignee: Pacific Communication Sciences, Inc., San Diego, Calif.

[21] Appl. No.: 598,347

[22] Filed: Feb. 8, 1996

[51] Int. Cl.⁶ .................................................. H01M 10/46
[52] U.S. Cl. ........................... 320/121; 320/126; 320/135
[58] Field of Search .................................... 320/3, 5, 6, 7, 320/8, 9, 13, 15, 32, 56, 118, 121, 125, 130, 135, 127; 307/66; 364/707

[56] References Cited

U.S. PATENT DOCUMENTS

| | | | |
|---|---|---|---|
| 2,818,543 | 12/1957 | Dodge | 320/3 |
| 4,210,854 | 7/1980 | Godard | 320/10 |
| 4,667,142 | 5/1987 | Butler | 320/6 |
| 5,204,610 | 4/1993 | Pierson et al. | 320/15 |
| 5,387,858 | 2/1995 | Bender et al. | 320/15 X |
| 5,568,038 | 10/1996 | Tatsumi | 320/56 X |

*Primary Examiner*—Edward Tso
*Attorney, Agent, or Firm*—Baker, Maxham, Jester & Meador; Steven A. Shaw

[57] ABSTRACT

A system and method for increasing the available energy and system runtime of battery powered electric devices which use non-rechargeable cells as an energy source. The present invention employs techniques for using energy from both rechargeable and non-rechargeable batteries in a manner which discharges each of the different cells within their optimal discharge rate. In particular, the non-rechargeable batteries are used for a low rate of system discharge and rechargeable cells supplement the non-rechargeable batteries for a higher system loads. In a preferred embodiment of the present invention, when the system load is at a very low level, the rechargeable battery is recharged using power from the non-rechargeable battery. The result of the techniques of the present invention is the lowering of discharge rate and hence increasing the capacity of the non-rechargeable cell.

15 Claims, 6 Drawing Sheets

SYSTEM AND METHOD FOR INCREASING THE AVAILABLE ENERGY IN NON-RECHARGEABLE BATTERIES

BACKGROUND OF THE INVENTION

1. Field of the Invention

This invention relates to battery powered electronic devices, and more particularly to a method and apparatus for increasing the system runtime of a battery powered electronic device using non-rechargeable batteries as an energy source.

2. Description of the Related Art

Battery powered electronic devices of many kinds are characterized by device loads turning on and off at different times and thus, summing together in a variety of load combinations. These load combinations create power requirements which range widely depending upon the number of loads simultaneously connected and the nature of each load. Also, the on/off duty cycle of these loads can vary significantly with much time being spent in very low power idle modes.

High load situations can significantly lower battery life. That is, the more power required from the battery within a defined period of time, the less effective capacity the cell will have. This is because of a number of factors, including battery construction techniques, Ohmic resistance, activation resistance, and several "real world" limitations. This applies to all battery chemistries, but is more pronounced for non-rechargeable cells than for rechargeables. The reason is that the internal resistance of non-rechargeable cells is significantly larger than that of rechargeable cells.

In the case of many battery operated electronic devices that use alkaline (non-rechargeable) cells, the effect of decreasing cell capacity with increasing discharge rate can become very pronounced. For example, cell capacity decreases very significantly at discharge rates of greater than 10 percent of the manufacturers rated capacity for the cell. Nevertheless, many battery operated devices (such as wireless communication equipment using alkaline cells) have system design constraints which require electronic loads in the system which require power to be supplied at rates which are, at times, greater than the manufacturer's rated discharge rate for the alkaline cell. This situation effectively derates the alkaline cell, which provides less effective capacity, and therefore less system runtime.

In the case of non-rechargeable alkaline cells, the impact on system runtime is from two discharge current related sources. The first is conductive losses within the cell itself. These losses increase exponentially with increases in discharge current. The second is from the voltage drop at the terminals because of the conductive losses. This cell terminal voltage drop, will at some point pull the battery voltage outside the regulation limit of the connected electronic circuitry. Therefore, as the discharge rate of the alkaline cell increases, there will be more internal cell conductive losses, thereby subtracting from the cell's net energy. There will also be a voltage drop (under system load) which will cause conversion and regulation to be difficult and expensive (particularly in the single cell case) using existing power conversion techniques and semiconductor materials. The voltage drop will therefore leave some of the alkaline cell's energy inaccessible to the system. This is notable because there may still be energy left in the cell, however, the system must decrease its load to allow it to be used. The energy left in the cell because the terminal voltage sag under load will typically exceed the conductive losses.

In view of these considerations, it is observed that in the case of many electronic devices that use non-rechargeable alkalines, decreasing the maximum sustained current drain provides runtime benefits that are greater than the net change in active system load. This is demonstrated in the graph shown in FIG. 1, which illustrates that a cell capacity evaluated at discharge rate 1 is greater than the same type battery discharged at discharge rate 2, where discharge rate 2 is greater than discharge rate 1.

Given load requirements that would derate non-rechargeable alkaline cells, there are several ways of decreasing the system load power requirement on the alkaline battery, and hence yielding a greater system runtime. The most typical method is to decrease the power requirement of the actual system load itself by decreasing functions performed by the load or using advanced technologies and techniques in the loads themselves. The problem with this technique is that in many cases the loads simply cannot be decreased adequately to yield significant increases in system runtime.

Another method is to balance the discharge rate out of the alkaline battery via load sharing techniques with a lower internal resistance energy reservoir like a rechargeable NiCd battery. This will decrease sustained maximum current drain on the alkaline cell. Prior systems of this type have involved transferring energy from the alkaline cells to the rechargeable cells. As a result, system loads can then be sourced from the NiCds. The problem with this method is that there are many losses in this sequential transfer scheme. First, there is the conversion loss from the alkaline cells to the charging of NiCd cells. Second, there are charge efficiency losses associated with rechargeable chemistry. Third, there is a regulation loss from the NiCd cell to the eventual system load.

Thus, it would be desirable to provide a technique for increasing battery life, effective capacity, and therefore, system runtime in battery powered electronic devices by reducing the load on non-rechargeable battery cells. Furthermore, it would be desirable to provide a technique for decreasing the load on non-rechargeable battery cells so that more of the cell's energy is accessible to the system.

SUMMARY OF THE INVENTION

The present invention is a system and method for increasing the available energy, and system runtime of battery powered electronic devices which use non-rechargeable cells as an energy source. The present invention employs techniques for using energy from both rechargeable and non-rechargeable batteries in a manner which discharges each of the different cells within their optimal discharge ranges. In particular, the non-rechargeable batteries are used for low rates of system discharge and rechargeable cells supplement the non-rechargeable batteries for higher system loads. As a result, the non-rechargeable cells are not derated and unnecessary additional regulation losses are not imposed on the rechargeable cells. Further, the present invention is well suited for systems which have widely varying loads.

In accordance with one embodiment of the present invention, a method of supplying electrical power to an electronic device is provided which includes the steps of sensing the load of the electronic device and determining whether the load is above or below a predetermined threshold. When the sensed load is below a predetermined threshold, the present invention supplies all of the power to the device from a non-rechargeable battery. Conversely, when the sensed load is equal to or above the predetermined threshold, power is supplied to the device from both the non-rechargeable battery and a rechargeable battery.

In accordance with another embodiment of the present invention, the above-described method also includes the steps of determining whether the sensed load is above or below a second predetermined threshold which is lower than the first predetermined threshold. When the sensed load is below the second predetermined threshold, the rechargeable battery is recharged using power from the non-rechargeable battery.

In another embodiment of the present invention, an apparatus is provided for supplying electrical power to an electronic device. The apparatus includes a power source switch and non-rechargeable and rechargeable battery units, both coupled to the power source switch. A current sensor is coupled to the electronic device and also to the power source switch. The power source switch includes a means for determining when the current sensed by the current sensor is greater than a predetermined threshold. Also, the apparatus includes a means for supplying power to the electronic device from both the non-rechargeable and the rechargeable batteries only when the sensed current is greater than the predetermined threshold.

In another embodiment of the present invention, the above-described apparatus also includes a means for determining whether the sensed current is above or below a second predetermined threshold which is lower than the first predetermined threshold. This embodiment also includes a means for recharging the rechargeable battery using power from the non-rechargeable battery when the sensed load is below the second predetermined threshold. As a result, battery life in the non-rechargeable battery is increased since the system load requirements on the non-rechargeable battery are decreased. This results in increasing the effective capacity of the non-rechargeable battery by permitting more of the cell's energy to be accessible.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE PREFERRED EMBODIMENTS

The present invention is a system for enabling an electronic device to use energy from both non-rechargeable and rechargeable batteries so as to discharge each of the different cells within their optimal discharge ranges. The non-rechargeable batteries are utilized for low rates of device discharge and the rechargeable batteries supplement the non-rechargeables for higher device discharge rates. As a result, the non-rechargeable cells are not derated, nor are unnecessary additional regulation losses introduced via the rechargeable batteries. The present invention is well suited for widely varying device loads and allows for selective charging of the rechargeable cells when there is a minimal device load.

Figure 2:
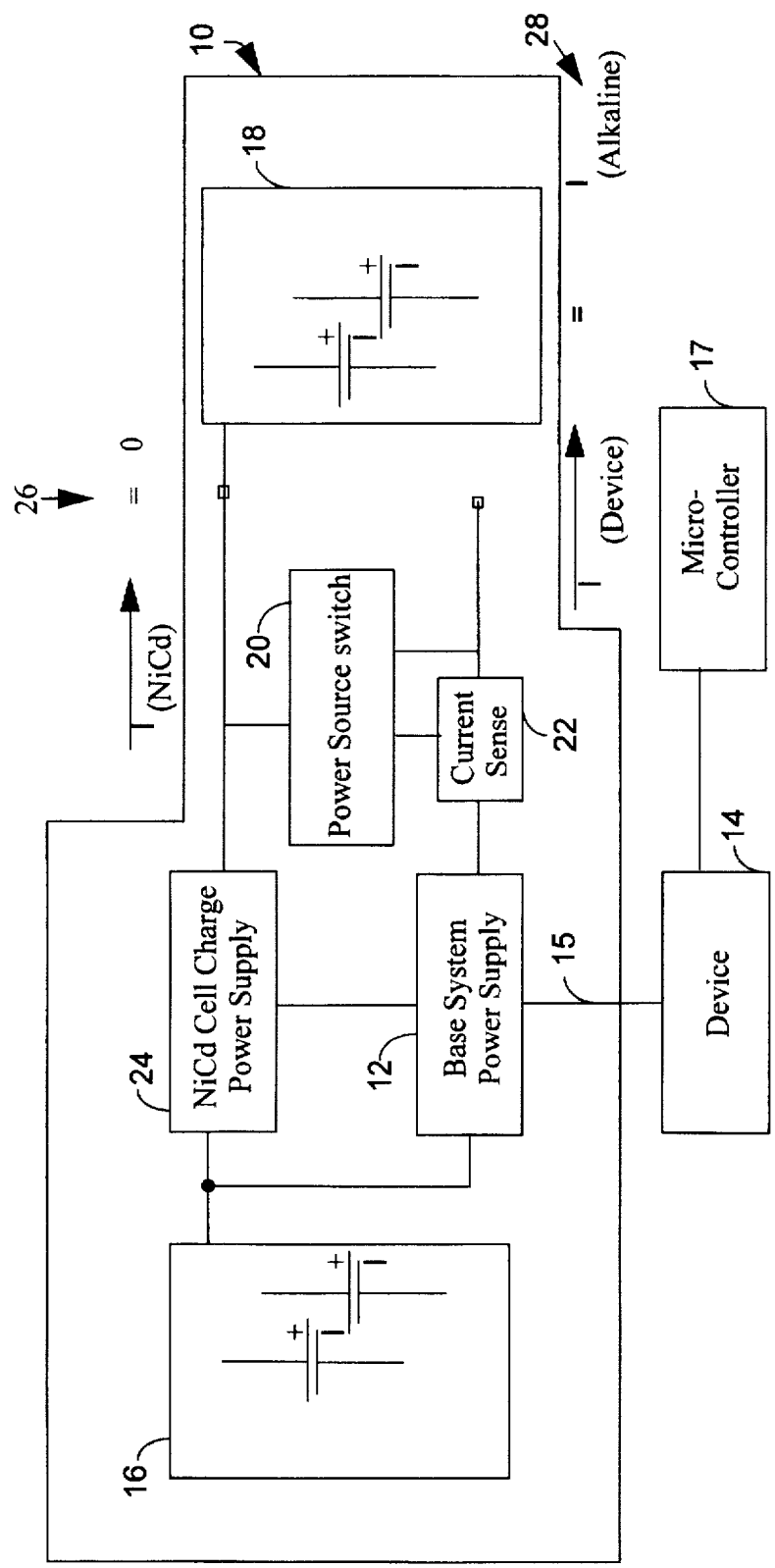
FIG. 2 is a block diagram of a system, in accordance with the present invention, illustrating the case of typical system load within the discharge rate of the non-rechargeable battery.
Figure 3:
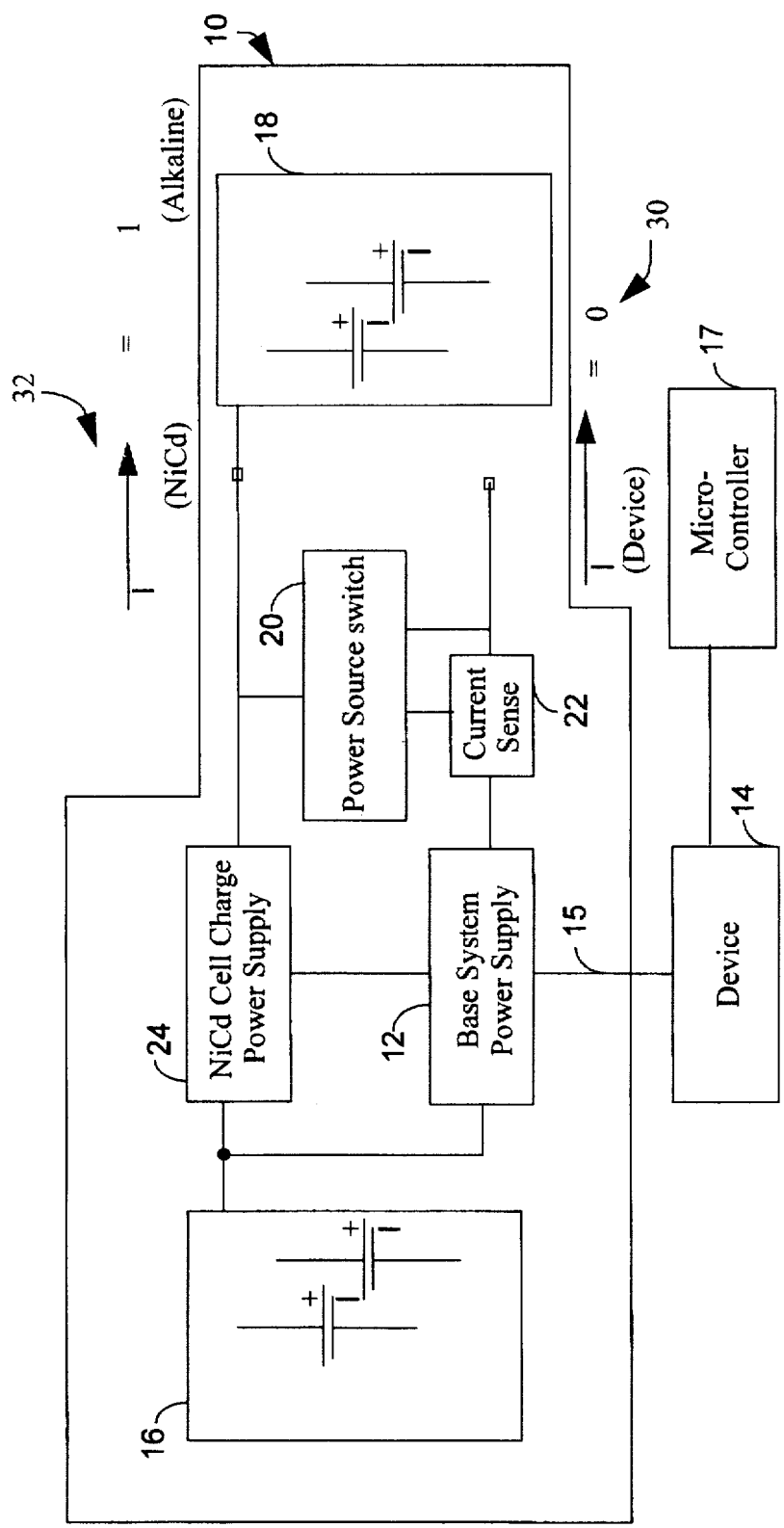
FIG. 3 is a block diagram of the present invention, in a case of the low system load where the rechargeable batteries are recharged.
Figure 4:
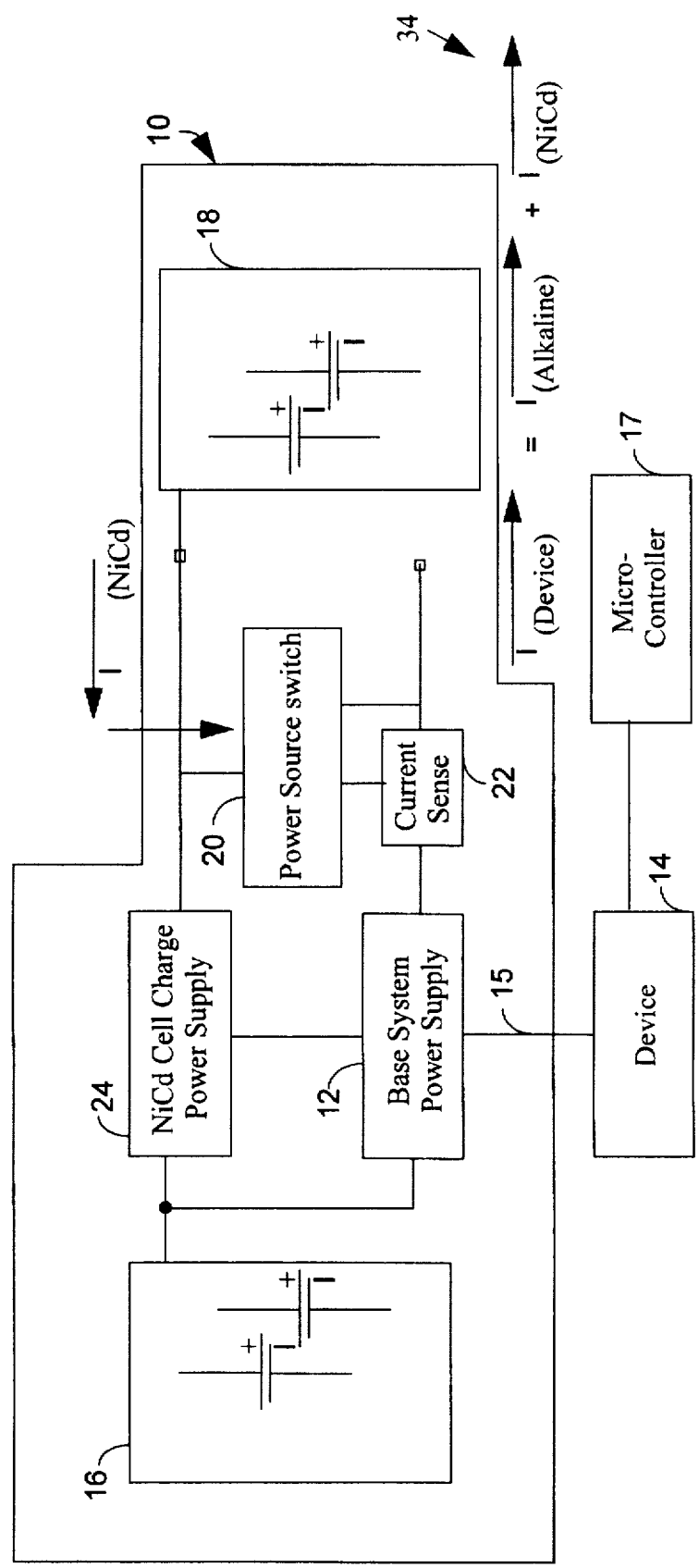
FIG. 4 is a block diagram of the present invention, illustrating a high system load situation where the system load is sourced from both the rechargeable and non-rechargeable batteries.

FIGS. 2–4 represents one embodiment of the present invention in various operational modes. It should be noted that the instantaneous energy drawn from the non-rechargeable cells via the present invention will approach the average energy over time needed to operate the system versus the peak system load needs. The current relationships are for reference, and do not take into consideration typical losses.

Figure 1:
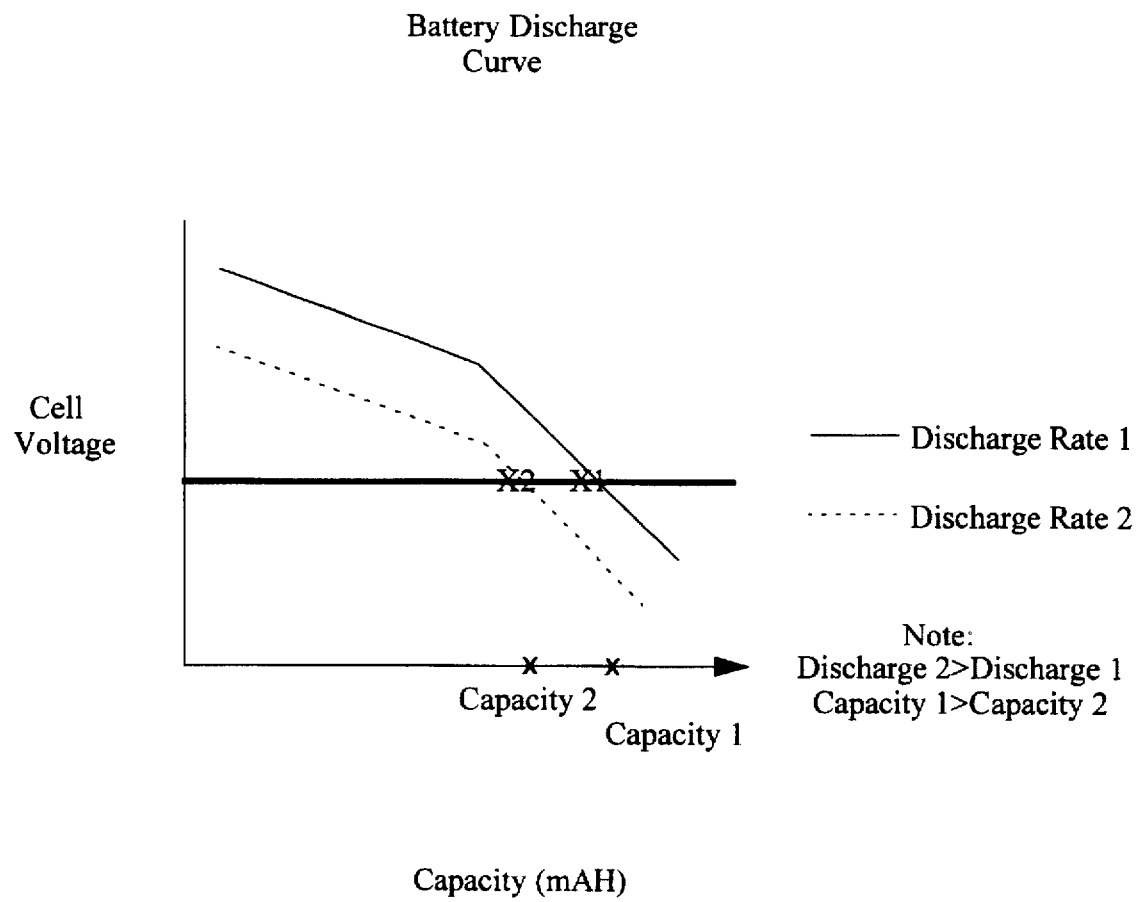
FIG. 1 is a battery discharge curve indicating the differing capacity of a non-rechargeable alkaline battery at two different discharge rates.

Referring to FIG. 2, a battery operated power supply system 10 is shown under a typical device load condition, including both rechargeable and non-rechargeable batteries in accordance with the present invention. The typical device load is defined as one which is within the normal alkaline discharge range. For example, in FIG. 1 a typical discharge rate would be represented by the lower discharge 1, which yields a higher capacity for the non-rechargeable cell. The state of the system 10 under typical system load condition is indicated diagrammatically by equation 26 (shown in FIG. 2) which indicates that no current is being drawn from the rechargeable cell and equation 28 (shown in FIG. 2) which indicates that all of the device power is derived from the alkaline cell.

It will be appreciated that the power supply system 10 may be utilized with a wide variety of battery operated portable electronic devices including computing and communications devices. The power is supplied to the device through a base system power supply 12 which supplies electrical power to an electronic device 14 through line 15. A non-rechargeable battery cell 16 and a rechargeable battery cell 18 provide electrical power for the battery supply system 10. In the preferred embodiment, the non-rechargeable cell 16 is an alkaline battery and the rechargeable cells are nickel cadmium batteries (NiCd).

The power supply system 10 also includes a current sense unit 22 which senses the instantaneous load of the electronic device 14. This current information measured by the current sense unit 22 is used by a processor, such as microcontroller 17, to determine in which mode the power supply system should be. That is, as described in more detail in connection with FIG. 5, the micro controller 17, using information from the current sense unit 22 controls a power source switch to place the power supply system 10 into one of three basic modes. These modes are characterized according to the level of current sensed by the current sense unit 18 as being low, typical and high system load conditions.

In a typical load condition, all of the power supplied by the power supply system 10 comes from the non-rechargeable alkaline cell 16. That is, electrical power is directed from the cell 16 to the base supply power system 12, and out to the device 14 being powered along output line 15.

Referring now to FIG. 3, a block diagram of the power supply system 10 is shown which is identical to that shown in FIG. 2, except that this time the system is in low system load condition. A charge power supply unit 24 is provided for transferring power from the non-rechargeable cell 16 to the rechargeable cell 18 in order to recharge the rechargeable cells 18 during the recharge mode, as described in more detail below. This mode, represents the situation where the level of current required by the device load is below a threshold referred to as $I_{(device\ standby)}$. $I_{(device\ standby)}$ is preferably set at a current level which is relatively low with regard to current drawn during typical system load condition. This is illustrated by equation 30, which indicates that there is low current draw by the device 14. In this mode the alkaline cell 16 is coupled to the rechargeable cell through the charge power supply 24. This is illustrated by equation 32, which indicates that the current from the alkaline cell 16 is being used to recharge the rechargeable cell 18.

Referring now to FIG. 4, the power supply system 10 of the present invention is shown in the high system load condition. All of the components are the same as those described above in connection with FIG. 2. However, in this case the power to the device is provided by both the non-rechargeable and rechargeable cells, as shown in equation 34. Power source switch 20 allows power from both the rechargeable cell 16 and rechargeable cell 18 to be utilized and transferred from the power supply system 10 to the electronic device 14 through output 15. It will be appreciated that high system load means that there is a high discharge rate such as discharge rate 2 shown in FIG. 1. Such a discharge rate, as discussed above, would result in a decreasing capacity of the non-rechargeable cell if not supplemented by the rechargeable cell. The Base system power supply would deliver a current of a maximum amount equal to $I_{Alkaline}$. Additional device current would be sourced from the rechargeable cell 18. Furthermore, in the low system load condition shown in FIG. 3, it will be appreciated that in some situations the rechargeable cells will not need recharging. Thus, the power supply system 10 has the capability (as discussed in more detail below) of determining whether the cells need recharging and only performing the recharging when it is needed. For example, in FIG. 3, the function of determining whether the rechargeable cells need recharging or not will be performed by sensing circuitry and control outside of the power supply system 10. This would be typically done via a processor or microcontroller using conventional technologies known in the art.

In accordance with another embodiment of the present invention, the rechargeable cells may be recharged utilizing a source of power external to the power supply system 10 of the present invention. This gives the user greater flexibility since the rechargeable batteries may then be recharged utilizing either the non-rechargeable cells or an external source when that external source is available. In some embodiments of the present invention, it may even be desired to have the recharging performed exclusively by external power. In such cases, steps 50 and 54 in FIG. 5 may, or may not, be omitted.

Figure 5:
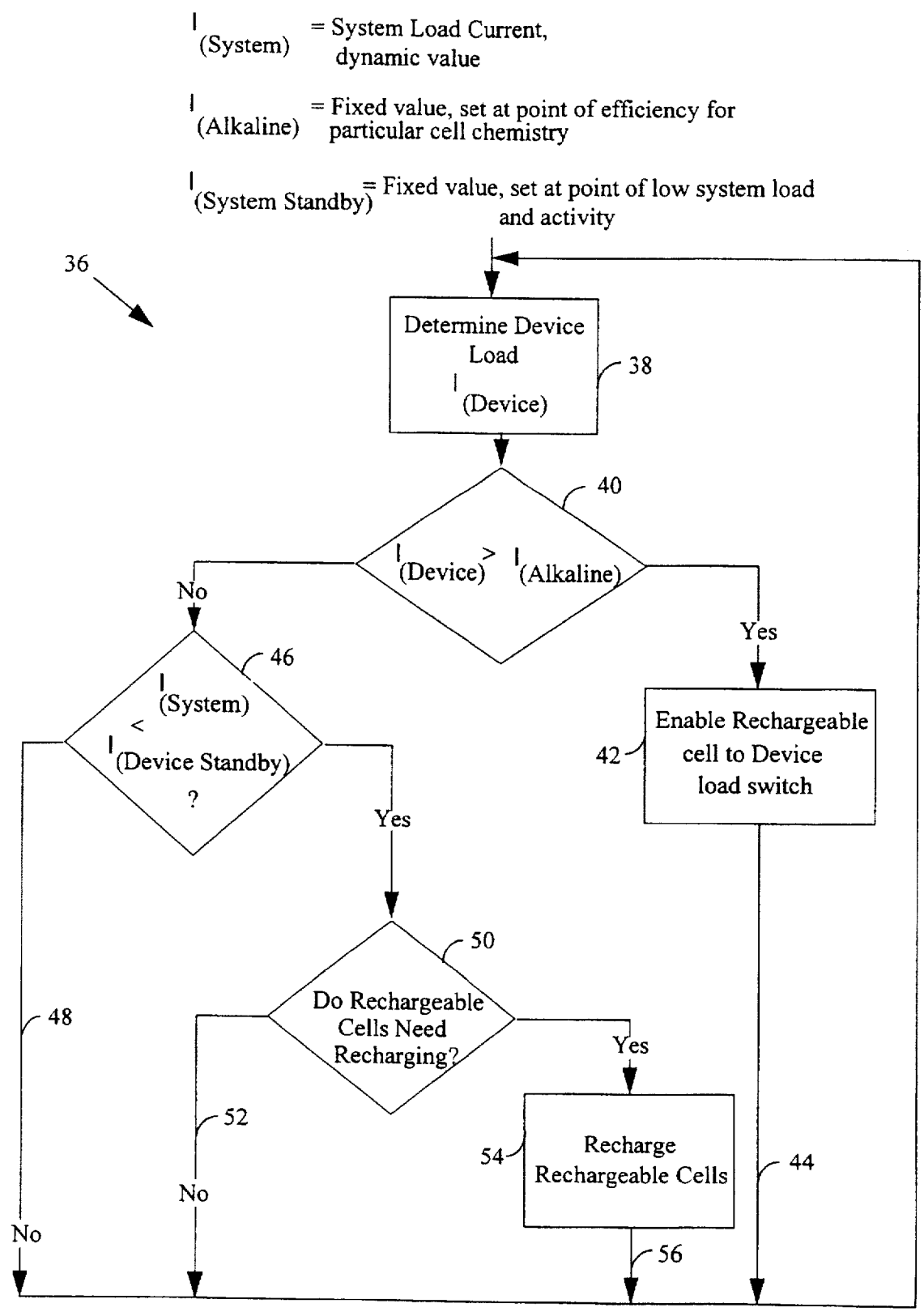
FIG. 5 is flow chart illustrating the steps taken in the method in accordance with the present invention.

Referring now to FIG. 5, a flow chart showing the logic control needed to implement the invention is shown. In one embodiment of the present invention, this logic may be performed by microcontroller 17. However, it will be appreciated by those skilled in the art that some of these functions can be performed by appropriate hardware elements. Conversely, the microcontroller may also be used to sense the device load, for example, by responding to the energy demands of the microcontroller itself. The software routine 36, of FIG. 5 begins in step 38 where the device load is determined. The device load is represented as $I_{(device)}$. The device load is a dynamic value that depends on the state of the electronic device 14, which is powered by the power supply system 10. In one embodiment of the present invention, the current required by the device load may be determined by the current sense unit 22. The system 10 determines whether the current required by the device load results in a discharge rate which is greater than the maximum desired discharge rate of the non-rechargeable cells. The maximum $I_{(alkaline)}$ is a fixed value that is determined by the particular non-rechargeable cell chemistry. This determination is performed in step 40. If yes (that is, "$I_{(device)}$" is greater than "$I_{(alkaline)}$"), the rechargeable cell is enabled to the power source switch 20 in step 42, and the system will be in the high system load condition described above in connection with FIG. 4. The program 36 will then proceed through path 44 back to step 38.

If, instead, the current required by the device load as determined in step 40 results in a discharge rate which is less than or equal to the maximum desired discharge rate for the non-rechargeable cells, then the system proceeds to step 46, where it is determined whether the current is less than $I_{(device\ standby)}$. If not, step 46 proceeds through path 48 back to step 38, and the system 10 remains in the typical device load condition, as described above in connection with FIG. 2.

However, if the current drawn by the device load is below the $I_{(device\ standby)}$ then program 36 proceeds to step 50, where it is determined whether the rechargeable cells 18 need recharging. As described above, this determination may be made by non-power supply system logic in the microprocessor 17 which would activate NiCd Cell charge power supply 24. If the rechargeable cells do not need recharging, then the process proceeds through path 52 back to step 38 and the system remains in the typical system load mode described in FIG. 2. If the rechargeable cells do need recharging, then the rechargeable cells are recharged in step 54 as described above in connection with FIG. 3. The program will then proceed through path 56 back to step 38 and recharging will continue until step 50 determines that the cells no longer need recharging, or until system load changes as determined by steps 40 and 46. In an alternative embodiment of the present invention, a determination is made as to whether the discharge rate is less than the maximum desired discharge rate of the non-rechargeable cells. This determination is made instead of the determination previously recited in step 40. If no (that is "$I_{(device)}$" is greater than or equal to "$I_{(alkaline)}$"), the rechargeable cell is enabled to the power source switch 20 in step 42, and the system will be in the high system load condition described above in connection with FIG. 4. Accordingly, it should be understood that when "$I_{(device)}$" is equal to "$I_{(alkaline)}$", either step 42 or step 46 may be performed, depending upon the application and implementation of the electronic device being powered.

One of the many important applications of the present invention is wireless communication devices where battery runtimes can be an important factor in consumer acceptance and product success. For example, in one wireless communication device using a single alkaline cell without the techniques of the present invention, a typical runtime may be approximately 13.5 days. With the use of the present invention, however, the average discharge rate of the alkaline cell may approach 100 mA @100 m Wh per day. This discharge rate is well within the manufacturer's rated discharge of the cell and would yield 18–19 days of runtime This would result in a 33 percent battery runtime improvement. In other devices, the increase in system runtime resulting from the use of the present invention might allow a device which otherwise requires more expensive battery technologies to have adequate system runtime using inexpensive and readily available alkaline cells.

Figure 6A:
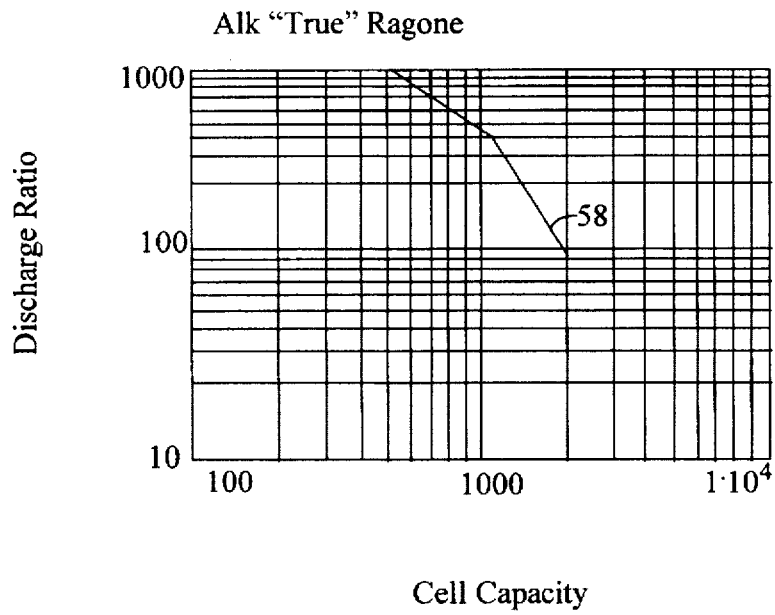
FIGS. 6A and 6B are Ragone plots of discharge rates of non-rechargeable batteries.
Figure 6B:
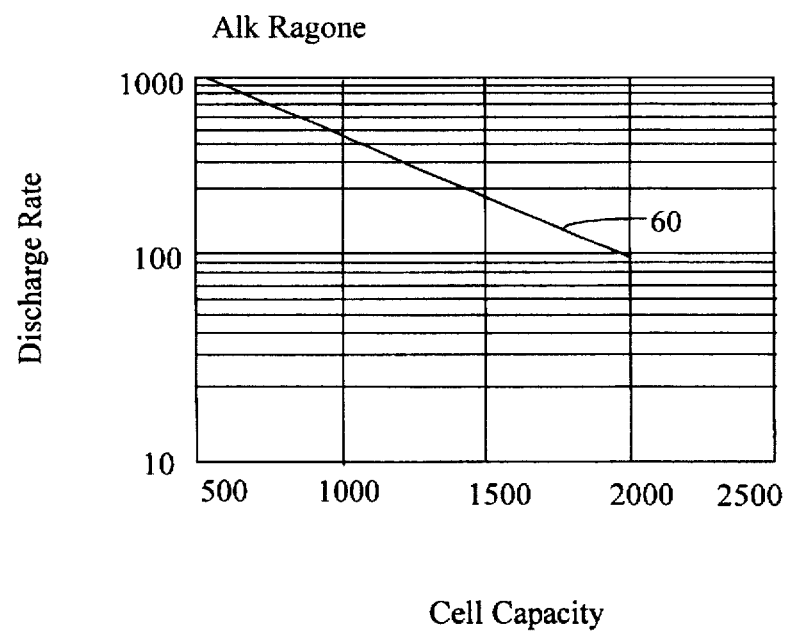

Referring now to FIGS. 6A and 6B, Ragone plots of the discharge of non-rechargeable alkaline batteries are shown. It will be appreciated that a Ragone plot is a means of plotting the discharge rate versus capacity for a battery. FIGS. 6A and 6B depicts curves 58 and 60 respectively which show the discharge rate of an alkaline battery in miliamps (mA) versus the resulting cell capacity in units of milliamp hours (mAh). In this data the end of the discharge voltage capacity is reached in these graphs when the discharge voltage equals 0.9 volts. FIGS. 6A and 6B differ only in that FIG. 6A has both the x and y axis on a logarithmic scale and in FIG. 6B the x axis is on a linear scale and the y axis is logarithmic. Curves 58 and 60 show that as the discharge rate is reduced (in this case from about 1,000 to 100 milliamps), the cell capacity increases (from about 500 mAh at 1,000 milliamp discharge rate to about 2,000 mAh at a discharge rate of 94 miliamps). This illustrates the dramatic increase in alkaline cell capacity that is achievable by reducing the discharge rate of the alkaline cell. This data underscores the benefits achieved by the present invention by reducing the discharge rate. That is, cell capacity is significantly improved by utilizing the techniques of the present invention to reduce the discharge rate for a non-rechargeable battery.

A number of embodiments of the present invention have been described. Nevertheless, it will be understood that various modifications may be made without departing from the spirit and scope of the invention. For example, the logical and physical organization of the components of the present invention may differ from those that are disclosed without departing from the scope of the present invention as will be clear to one of ordinary skill. Accordingly, it is to be understood that the invention is not to be limited by the specific illustrated embodiment, but only by the scope of the appended claims.

I claim:

1. A method of supplying electrical power to an electronic device, the method comprising the steps of:
   (a) sensing a load of the electronic device;
   (b) determining whether the load is above or below a first predetermined threshold;
   (c) when the sensed load is below the first predetermined threshold, supplying all power to the device from a non-rechargeable battery; and
   (d) when the sensed load is equal to or above the first predetermined threshold, supplying power to the electronic device from both the non-rechargeable battery and a rechargeable battery.

2. The method of claim 1 further comprising the steps of:
   determining whether the sensed load is above or below a second predetermined threshold which is lower than the first predetermined threshold; and
   when the sensed load is below the second predetermined threshold, recharging the rechargeable battery using power from the non-rechargeable battery.

3. The method of claim 2 further comprising the steps of determining whether the rechargeable battery needs recharging, and recharging the rechargeable battery when it is determined that it needs recharging.

4. The method of claim 1 further comprising the step of setting the predetermined threshold based on the cell chemistry of the non-rechargeable battery.

5. The method of claim 1 wherein the electronic device is a portable communication device.

6. The method of claim 1 wherein the non-rechargeable battery is an alkaline battery.

7. A method of supplying electrical power to an electronic device, the method comprising the steps of:
   (a) sensing a load of the electrical device;
   (b) determining which of three ranges the load is in, the three ranges being low, moderate or high loads;
   (c) when the load is in the moderate range, supplying all the power to the electronic device from a non-rechargeable battery;
   (d) when the load is in the high range, supplying power to the system from both a rechargeable and the non-rechargeable battery; and
   (e) when the load is in the low range, recharging the rechargeable battery using power from the non-rechargeable battery.

8. The method of claim 7 further comprising the step of repeating steps a–e.

9. An apparatus for supplying electrical power to an electronic device, the apparatus comprising:
   (a) a power source switch;
   (b) non-rechargeable battery unit;
   (c) rechargeable battery unit, coupled to the power source switch, having a rechargeable battery;
   (d) processor coupled to the power source switch which causes the power source switch to supply power to the electronic device from both the non-rechargeable battery and the rechargeable battery when a load current drawn by the electronic device is greater than a first predetermined threshold;
   (e) current sensor coupled to the electronic device, the power switch, and to the processor; and
   (f) the processor including means for determining when the current sensed by the current sensor is greater than the first predetermined threshold.

10. The apparatus of claim 9 wherein the processor further comprises:
    (a) means for determining whether the current sensed by the current sensor is above or below a second predetermined threshold, which is lower than the first predetermined threshold; and
    (b) means for recharging the rechargeable battery using power from the non-rechargeable battery when the current sensed by the current sensor is below the second predetermined threshold.

11. The apparatus of claim 10, wherein the processor further comprises:
    (a) means for determining whether the rechargeable battery needs recharging, and recharging the rechargeable battery only if the rechargeable battery needs recharging.

12. The apparatus of claim 9 wherein said rechargeable battery is a NiCd battery and said non-rechargeable battery is an alkaline battery.

13. The apparatus of claim 9 wherein said electronic device is a portable computing device.

14. The apparatus of claim 9 where the electronic device is a portable communication device.

15. An apparatus for supplying electrical power to an electronic device, the apparatus comprising:

(a) a power source switch;

(b) non-rechargeable battery unit;

(c) processor coupled to the power source switch;

(d) rechargeable battery unit, coupled to the power source switch;

(e) current sensor coupled to the electronic device the power source switch, and to the processor; and (f) wherein the processor determines when a current sensed by the current sensor is greater than a predetermined threshold, and wherein the power source switch supplies power to the electronic device from both the non-rechargeable battery and the rechargeable battery unit when the sensed current is greater than the predetermined threshold.

* * * * *